US006849970B2

(12) United States Patent
Watanabe

(10) Patent No.: US 6,849,970 B2
(45) Date of Patent: Feb. 1, 2005

(54) LINEAR MOTOR

(75) Inventor: Koji Watanabe, Tokyo (JP)

(73) Assignee: Chronofang Co., Ltd., Tokyo (JP)

( * ) Notice: Subject to any disclaimer, the term of this patent is extended or adjusted under 35 U.S.C. 154(b) by 0 days.

(21) Appl. No.: 10/342,213

(22) Filed: Jan. 15, 2003

(65) Prior Publication Data

US 2003/0132672 A1 Jul. 17, 2003

(30) Foreign Application Priority Data

Jan. 16, 2002 (JP) ........................................ 2002/007931

(51) Int. Cl.[7] ............................................. H02K 41/00
(52) U.S. Cl. ....................................................... 310/12
(58) Field of Search ............................. 310/12, 13, 14

(56) References Cited

U.S. PATENT DOCUMENTS

| 4,460,855 | A | * | 7/1984 | Kelly | 318/135 |
|---|---|---|---|---|---|
| 4,810,914 | A | * | 3/1989 | Karidis et al. | 310/12 |
| 4,839,543 | A | * | 6/1989 | Beakley et al. | 310/12 |
| 4,912,343 | A | * | 3/1990 | Stuart | 310/14 |
| 5,808,381 | A | * | 9/1998 | Aoyama et al. | 310/12 |
| 5,808,382 | A | * | 9/1998 | Ira et al. | 310/12 |
| 5,994,798 | A | * | 11/1999 | Chitayat | 310/12 |
| 6,064,128 | A | * | 5/2000 | Yagoto et al. | 310/12 |
| 6,075,297 | A | * | 6/2000 | Izawa et al. | 310/12 |
| 6,215,206 | B1 | * | 4/2001 | Chitayat | 310/12 |
| 6,242,822 | B1 | * | 6/2001 | Strothmann et al. | 310/12 |
| 6,313,552 | B1 | * | 11/2001 | Boast | 310/14 |
| 6,348,746 | B1 | * | 2/2002 | Fujisawa et al. | 310/12 |
| 6,570,273 | B2 | * | 5/2003 | Hazelton | 310/12 |
| 6,611,074 | B2 | * | 8/2003 | Bartolotti | 310/114 |

* cited by examiner

Primary Examiner—Thanh Lam
Assistant Examiner—Judson H. Jones
(74) Attorney, Agent, or Firm—McGinn & Gibb, PLLC

(57) ABSTRACT

A linear motor includes a plurality of electromagnetic coils continuously arranged and a magnet assembly disposed such that it may travel due to the interaction between itself and the magnetic fluxes from the coils. The coils include U, V, and W phase coils in star connection. The coils of the individual phases are installed in series around a hollow-shaft center core over the travel range of the magnet assembly such that the magnetic pole axis thereof is oriented in the same direction as the axis of the center core. The magnet assembly has an annular shape so that it may surround the coils, and is formed of a plurality of permanent magnets. The magnets are combined in series such that the same magnetic poles oppose each other and the magnetic pole axis is oriented in the same direction as the axis of the center core.

21 Claims, 16 Drawing Sheets

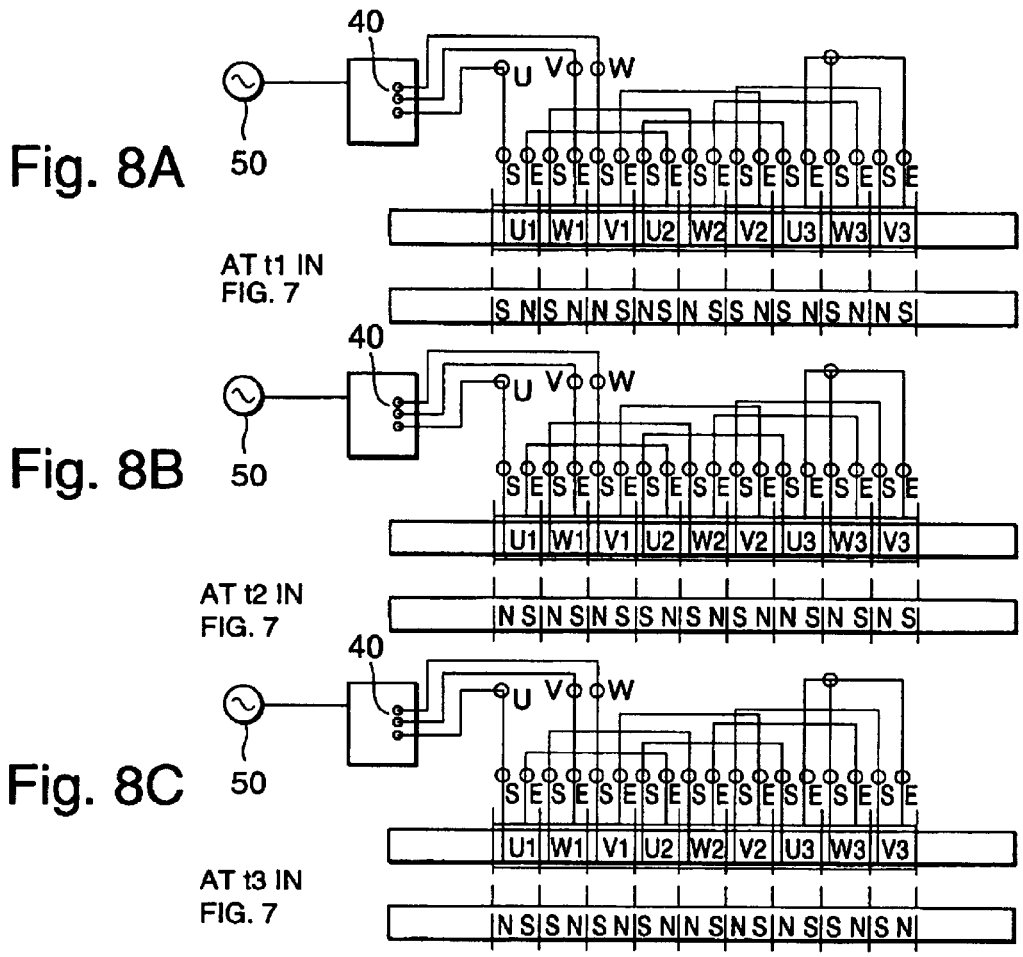
Fig. 8A  AT t1 IN FIG. 7
Fig. 8B  AT t2 IN FIG. 7
Fig. 8C  AT t3 IN FIG. 7
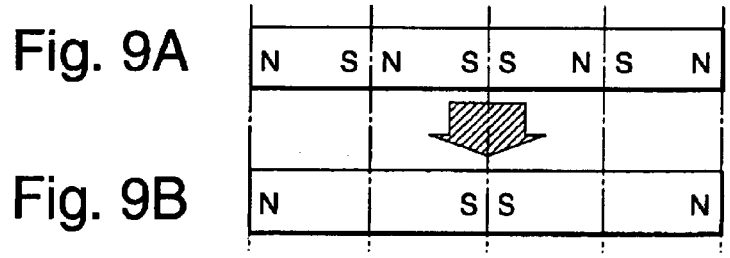
Fig. 9A
Fig. 9B (FIG. 8A)

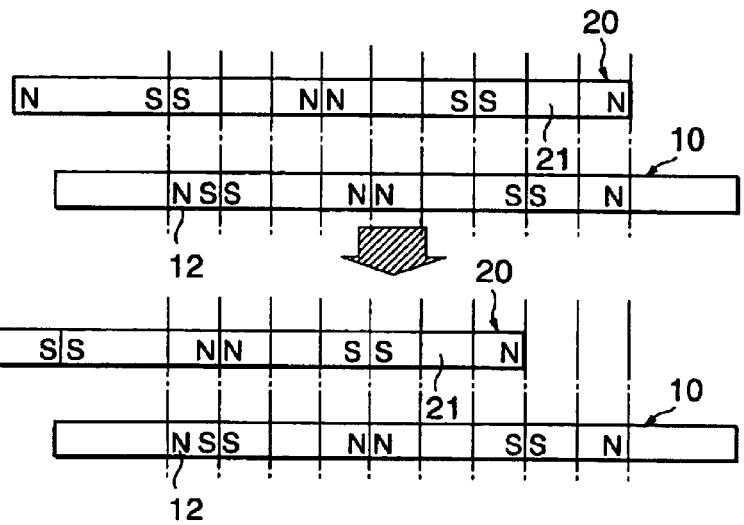
Fig. 13A
Fig. 13B
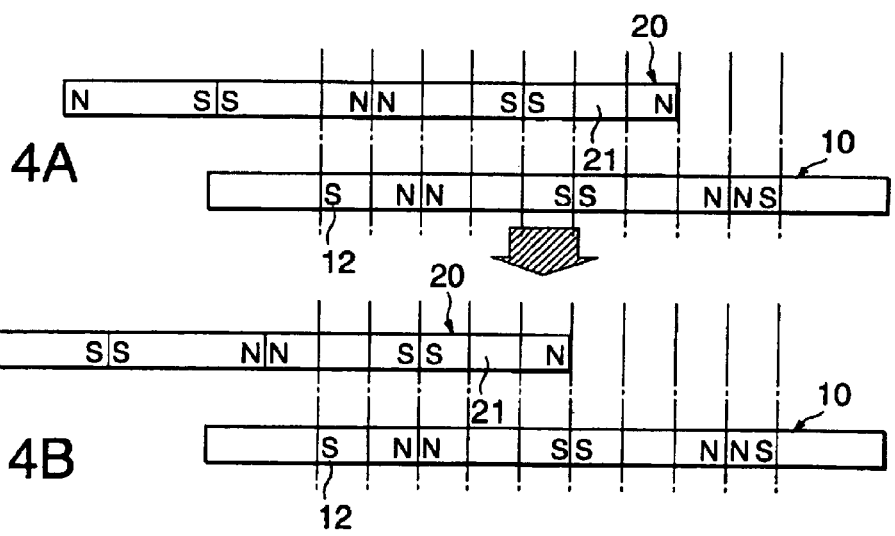
Fig. 14A
Fig. 14B

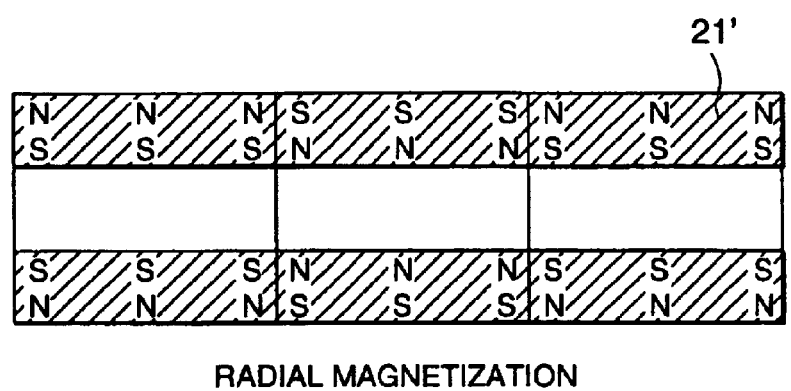
Fig. 15A  RADIAL MAGNETIZATION
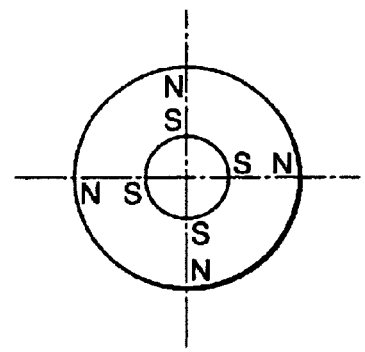
Fig. 15B

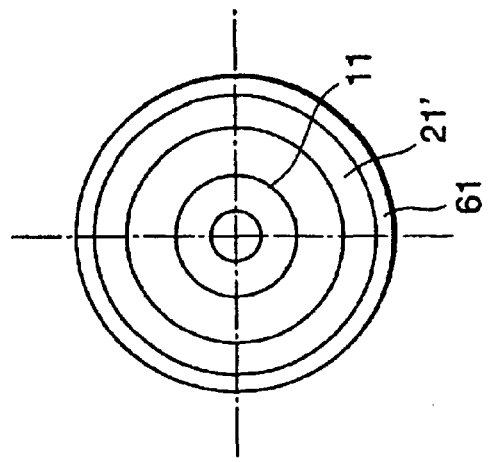
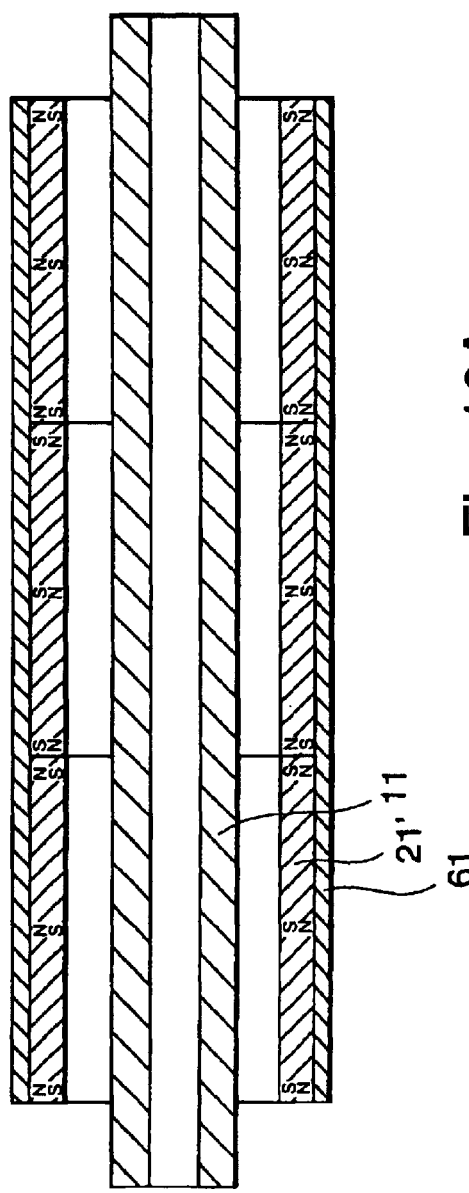
Fig. 16B
Fig. 16A

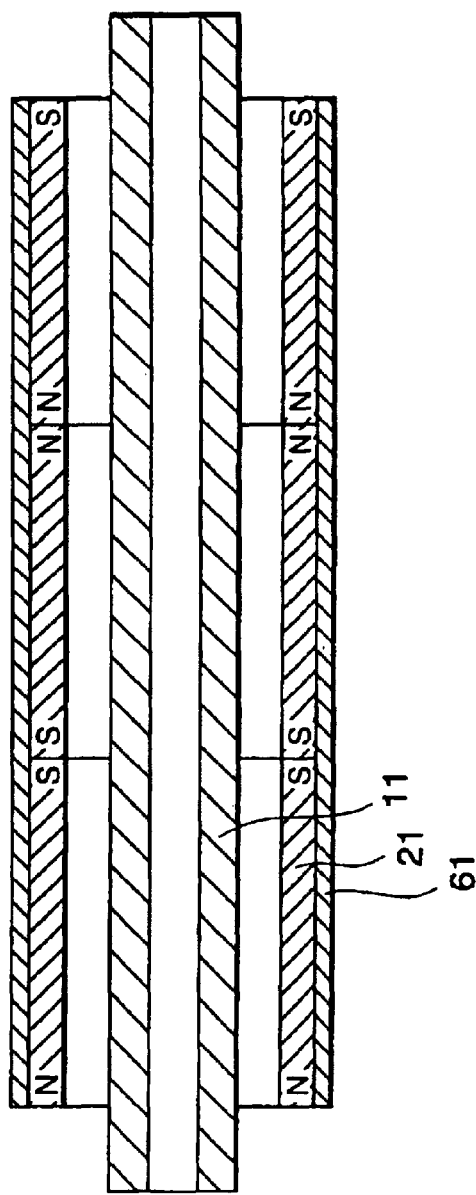
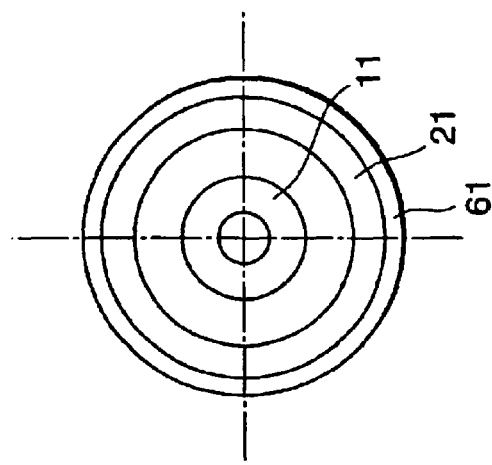
Fig. 17A
Fig. 17B

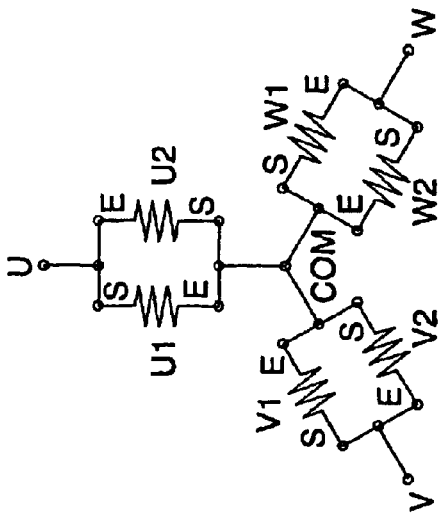
Fig. 20C DOUBLE-STAR CONNECTION
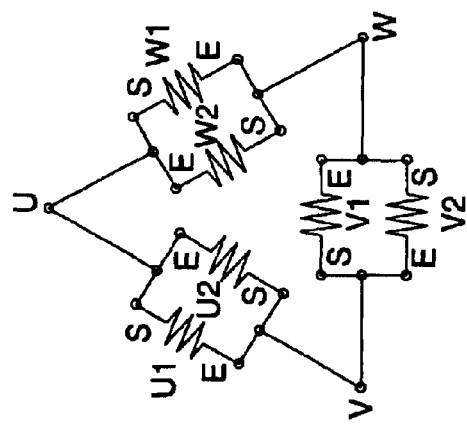
Fig. 20B DOUBLE-DELTA CONNECTION
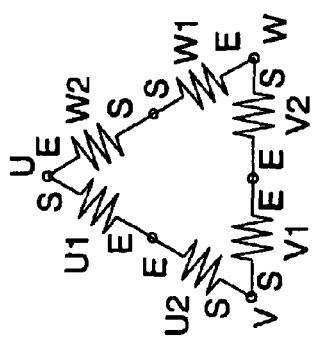
Fig. 20A DELTA CONNECTION
Fig. 20D COIL ARRANGEMENT
| U1 | W1 | V1 | U2 | W2 | V2 |

LINEAR MOTOR

BACKGROUND OF THE INVENTION

The present invention relates to a linear motor.

A variety of types of linear motors are available. Most linear motors that are not required to provide high driving power as in the case of the driving source for a linear motorcar are implemented by combining permanent magnets and electromagnetic coils. A linear motor combining permanent magnets and electromagnetic coils is considered to be applicable to a driving source for a precision micro stage or a precision positioning stage in the field of, for example, semiconductor manufacturing equipment. This is because a driving mechanism based on a linear motor is advantageous in that it provides a higher driving speed and higher positioning accuracy than those provided by a ball screw driving mechanism, which has conventionally been mainstream. The driving mechanism using a linear motor is also advantageous in that it has high repetitious positioning accuracy, has less overshoot and undershoot at starts and stops, and has less speed ripples during constant speed travels.

Referring to FIG. 1, a linear motor that combines permanent magnets and electromagnetic coils will be briefly explained. In FIG. 1, a plurality of permanent magnets 102 are disposed with intervals provided among them at opposing positions of inner walls of a yoke 101 having a substantially U-shaped cross section. A movable coil assembly 103 is provided between the opposing inner walls of the yoke 101 such that the movable coil assembly 103 moves in the direction in which the yoke 101 extends. The movable coil assembly 103 produces a driving force due to the interaction between the magnetic flux generated by the movable coil assembly 103 and the adjoining magnetic flux from the permanent magnets 102. The driving force moves the movable coil assembly 103 by being guided by a guiding mechanism (not shown). The movable coil assembly 103 is normally combined with a member being conveyed, such as a table or stage on which semiconductor wafers are mounted.

When a three-phase drive linear motor is used, the movable coil assembly 103 is provided with a combination of three coils, a U-phase coil, a V-phase coil, and a W-phase coil, as a basic element.

As described above, a conventional linear motor usually combines fixed permanent magnets and a movable coil. Such a linear motor poses the problems discussed below.

First, the linear motor requires a power cable for supplying electric power to the movable coil assembly 103. Since the movable coil assembly 103 is movable, the power cable has to be made flexible to smoothly follow the travel of the movable coil assembly 103. The flexible power cable and a flexible cable supporting member require periodical maintenance or replacement to prevent disconnection. Furthermore, the flexible cable supporting member requires an installation space.

Second, the movable coil assembly 103 generates considerable heat, whereas it is difficult to cool the movable coil assembly 103 since it moves. In addition, a large space for cooling and a complicated cooling structure would be necessary. Unless the problem of the heat generated in the movable coil assembly 103 is solved, the temperature around the movable coil assembly 103 rises. This causes the workpieces being carried, such as semiconductor wafers, mounted on the table to develop deformation, including warping or expansion, making it difficult to maintain dimensional accuracy of the workpieces being carried.

Third, less effective magnetic flux for generating thrust because of the following reasons. In the type of a linear motor shown in FIG. 1, the coil of the movable coil assembly 103 has cylindrical or rectangular coils, while the permanent magnets are merely provided on two opposing surfaces. Increasing the exciting current of the movable coil assembly 103 in order to increase the thrust would make it even more difficult to solve the second problem.

A fourth problem is marked especially in a plane opposing type (flat bed type) linear motor. In this type of linear motor, a plurality of planar permanent magnets are disposed on a stator, while a plurality of coils is installed on a yoke of a moving unit to oppose the permanent magnets. At this time, the permanent magnets and the coils are discontinuously arranged. This causes "cogging" in which the positions where the yoke and the permanent magnets attract each other and the positions where no attraction between them occurs are encountered regularly and successively whenever the moving unit moves in the axial direction. The cogging is considered to directly cause so-called irregular speed.

SUMMARY OF THE INVENTION

Accordingly, it is an object of the present invention to provide a linear motor capable of solving the problems described above.

A linear motor according to the present invention includes a plurality of electromagnetic coils continuously arranged and a permanent magnet assembly disposed such that it may be moved by the interaction between itself and the magnetic fluxes from the electromagnetic coils.

According to an aspect of the present invention, the electromagnetic coils include U-phase, V-phase, and W-phase coils in star connection. These coils of individual phases are installed in series around a hollow-shaft center core over the full distance of the travel of the permanent magnet assembly such that the magnetic pole axis thereof is oriented in the same direction as that of the axis of the center core. The permanent magnet assembly has an annular shape so as to surround the electromagnetic coils and is formed of a plurality of permanent magnets. Each permanent magnet has a dimension that is three times the length of the coil of each phase in relation to the magnetic pole axis. The plural permanent magnets are combined in series such that the same magnetic poles face each other and the magnetic pole axis is oriented in the same direction as that of the axis of the center core.

BRIEF DESCRIPTION OF THE DRAWINGS

FIG. 8A through FIG. 8C illustrate the example of the magnetic poles induced in the nine coils shown in FIG. 6;

FIG. 9A and FIG. 9B illustrate the magnetic poles generated in all coils by the magnetic poles induced in the individual coils when four coils are used;

FIG. 13A and FIG. 13B illustrate the principle of how permanent magnets are driven when the permanent magnets are combined with the electromagnetic coils having the magnetic poles shown in FIG. 10C;

FIG. 14A and FIG. 14B illustrate the principle of how permanent magnets are driven when the permanent magnets are combined again with the electromagnetic coils having the magnetic poles shown in FIG. 10A;

FIG. 15A and FIG. 15B are a sectional view and a front view illustrating another example of permanent magnets used for constituting a mover in the present invention;

FIG. 16A and FIG. 16B are a sectional view and a front view illustrating an improved example of the mover in the present invention;

FIG. 17A and FIG. 17B are a sectional view and a front view illustrating another improved example of the mover in the present invention;

FIG. 20A through FIG. 20D illustrate additional examples of a three-phase coil used in the present invention;

DESCRIPTION OF THE PREFERRED EMBODIMENTS

Figure 1:
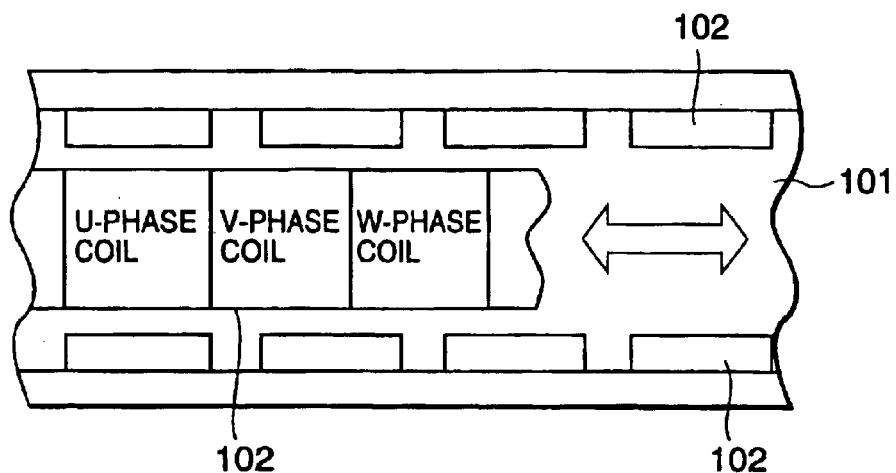
FIG. 1 is a diagram schematically showing the construction of a conventional linear motor.
Figure 2:
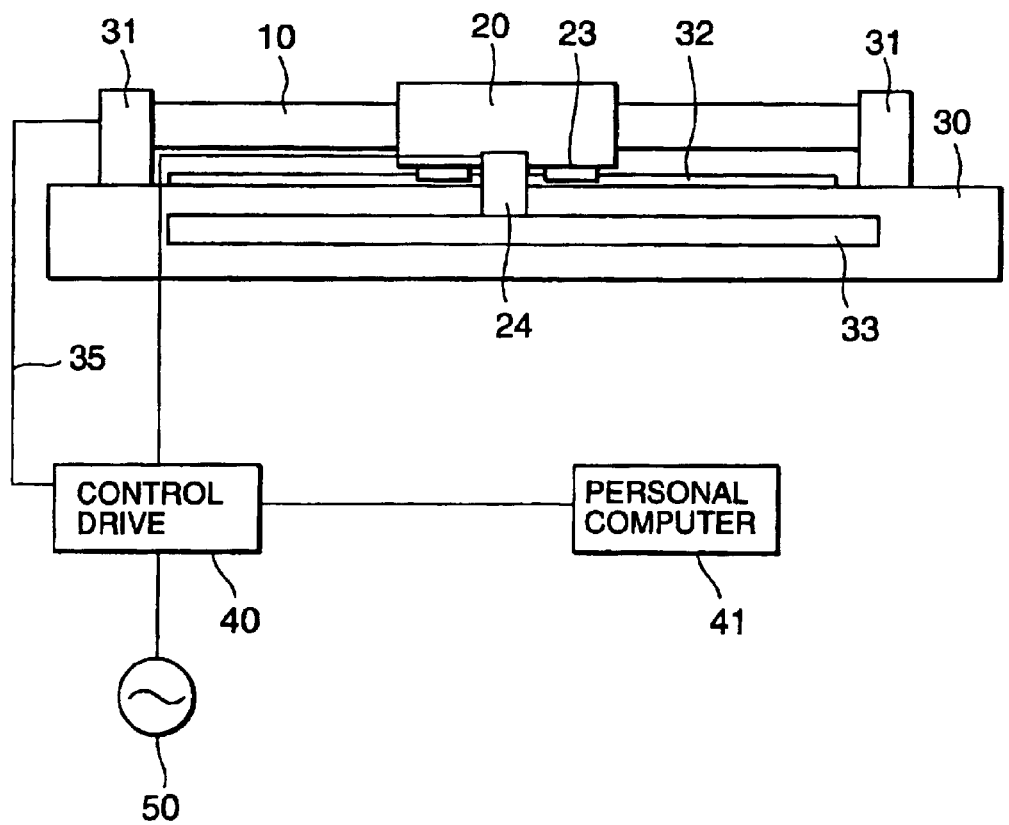
FIG. 2 is a diagram schematically showing the construction of a linear motor according to an embodiment of the present invention.
Figure 3A:
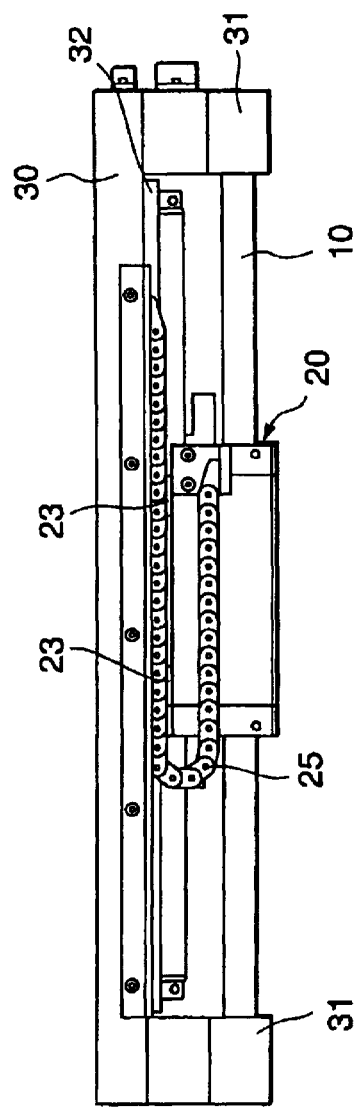
FIG. 3A through FIG. 3D show the linear motor shown in FIG. 2 observed from four directions.
Figure 3B:
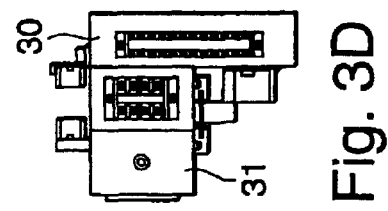
Figure 3C:
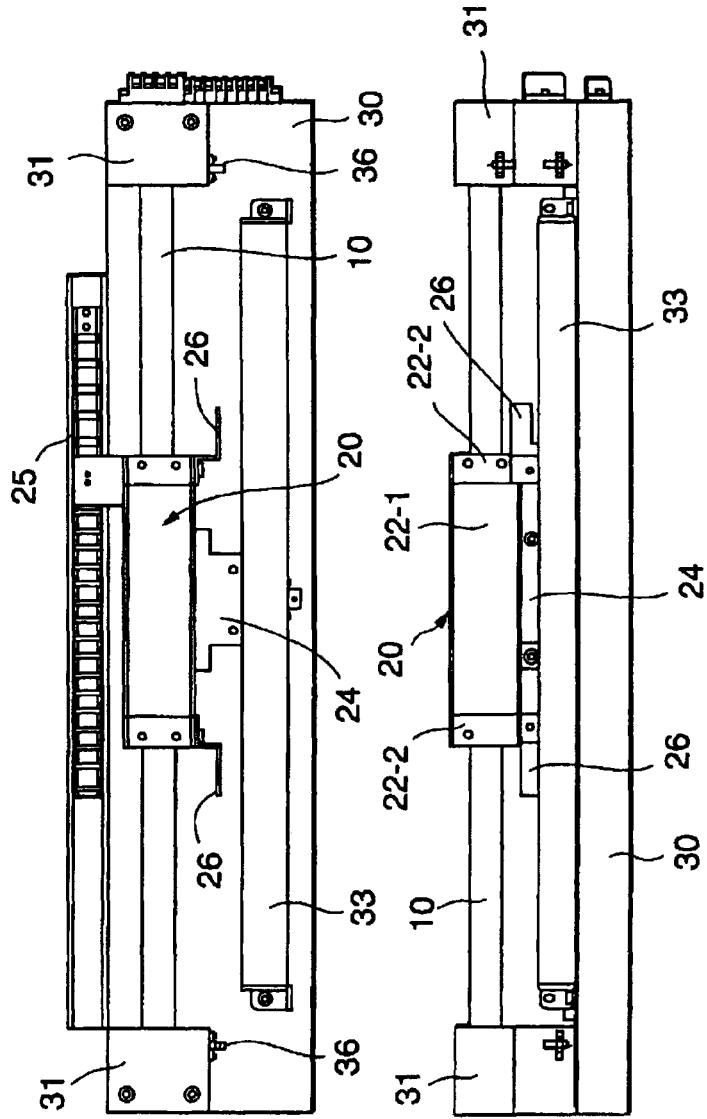
Figure 3D:
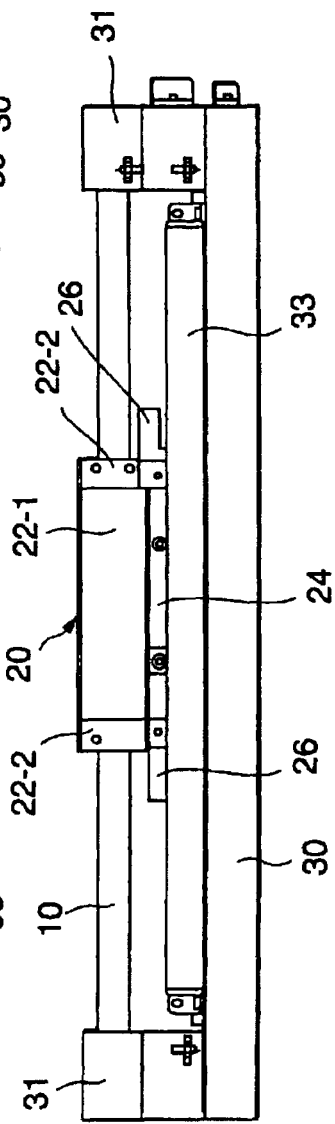

FIG. 2 shows a schematic construction of a linear motor according to a first embodiment of the present invention, and FIG. 3A through FIG. 3D are the views of a linear motor 4 shown in FIG. 2 and observed from four directions. More specifically, FIG. 3B is a top plan view, FIG. 3C is a side view observed from the lower side in FIG. 3B, FIG. 3A is a side view observed from the upper side in FIG. 3B, and FIG. 3D is a view observed from the right in FIG. 3B.

Referring to FIG. 2 and FIGS. 3A through 3D, the linear motor includes a shaft assembly (hereinafter referred to as "the stator") 10 that houses a plurality of electromagnetic coils (hereinafter referred to as "the coils") continuously arranged such that they are in close contact with each other. The linear motor also includes a movable magnet assembly (hereinafter referred to as "the mover") 20 that can travel in the same direction as that in which the stator 10 extends by the interaction between itself and the magnetic fluxes from these coils. The stator 10 is extended between two brackets 31 fixed on a base 30 with an interval provided therebetween.

Figures 4A, 4B:
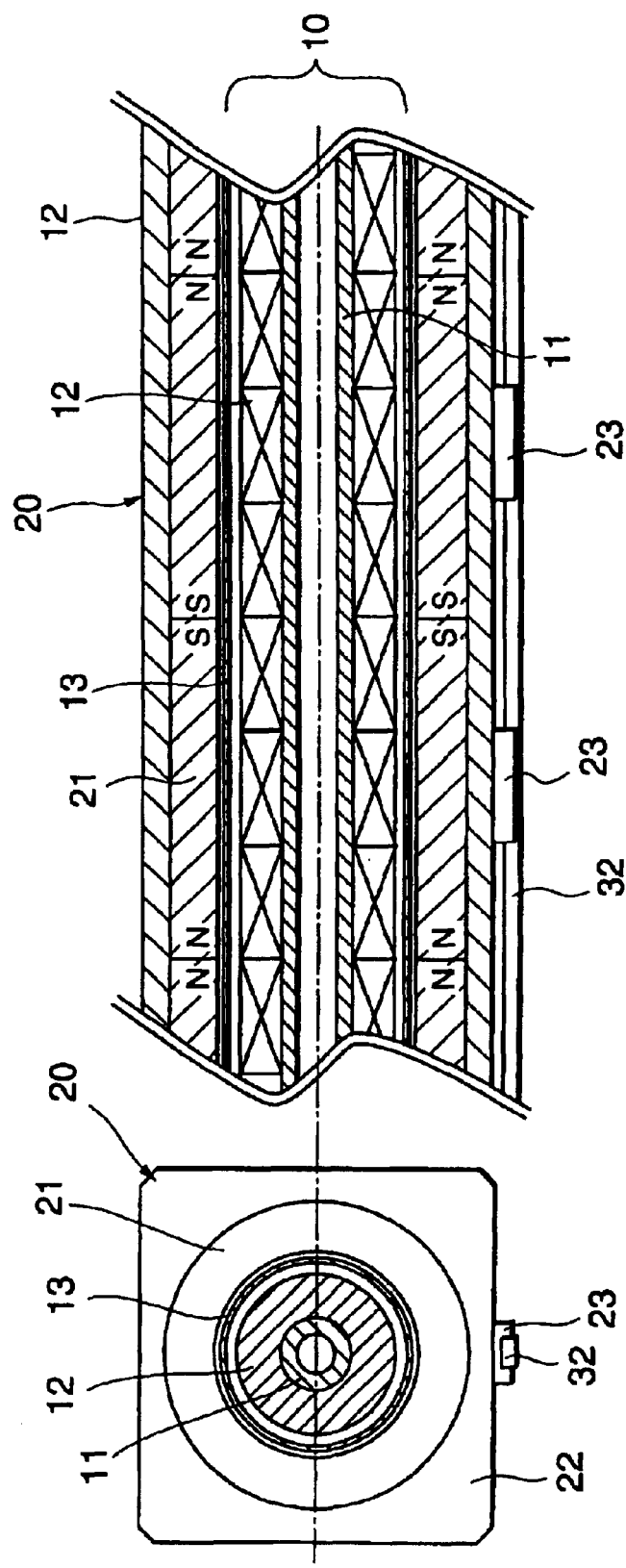
FIG. 4A and FIG. 4B illustrate the internal structures of a mover and a stator shown in FIG. 3A through FIG. 3D.

Referring also to FIG. 4A and FIG. 4B, the internal structures of the stator 10 and the mover 20 will be described. The stator 10 includes a hollow-shaft center core 11, a plurality of coils 12 installed around the center core 11, and a pipe 13 (cylindrical member) assembled to cover the outer periphery of the plural coils 12. The coils 12 include U-phase coil, V-phase coil, and W-phase coil, these coils being connected to a motor connection terminal of a control drive 40. These coils are installed around the center core 11 over substantially the full length of the travel stroke of the mover 20 such that the magnetic pole axis thereof are parallel to the axis of the center core 11. The magnetic pole axis of the coils mean the axis of the magnetic poles produced when the coils are excited, and it is generally accepted that the magnetic pole axis coincides with the central axis of the coils.

The mover 20 includes a plurality of annular permanent magnets 21 surrounding the coils 12, and a magnet case 22 accommodating the plural permanent magnets 21. The plural permanent magnets 21 have the same length. The plural permanent magnets 21 are combined in series and housed in the magnet case 22 such that the same magnet poles oppose each other and that the magnetic pole axis thereof is in parallel to the axis of the center core 11. The sizes of the coils 12 and the permanent magnets 21 depend upon conditions, such as the desired thrust and the size of the entire linear motor. All the permanent magnets 21, however, are formed to have the same axial dimension, which is three times the length of the coils 12 in the direction of their magnetic pole axis.

The inside diameter of the pipe 13 is slightly larger than the outside diameter of the coils 12, while the outside diameter thereof is slightly smaller than the inside diameter of the permanent magnets 21. Thus, a gap is formed between the outer surface of the pipe 13 and the inner surface of the permanent magnets 21 and between the outer surface of the coils 12 and the inner surface of the pipe 13. The hollow space of the center core 11 and the gap between the outer surface of the coils 12 and the inner surface of the pipe 13 can be used as the space for a coolant, such as a gas or liquid. A nonmagnetic metal material, such as stainless steel, is used for the pipe 13; however, it may be another material, e.g., a resin material.

The mover 20 must be moved with a gap maintained with respect to the outer periphery of the pipe 13, meaning that the mover 20 must be moved without contacting the pipe 13. This is accomplished by guide blocks 23 and a guide rail 32 described below. Two guide blocks 23 are attached to the magnet case 22. The two guide blocks 23 are slidably guided by the guide rail 32 disposed on the base 30 in the traveling direction of the mover 20.

The gap between the outer surface of the pipe 13 and the inner surface of the permanent magnets 21 does not have to be constant. In other words, whether the gap remains constant over the full length or whether it varies in the vertical or lateral direction, the resulting thrust will be the same, which means the thrust will not vary. This is because the permanent magnets 21 are annular, and the coils 12 are inside the annular permanent magnets 21. With this arrangement, the mover 20 and the stator 10 do not require strict mounting accuracy, and the components constituting them do not require strict machining accuracy, either.

Taking an example of the aforesaid components, the center core 11 uses, for instance, magnetic material, such as an iron, to impart the function as the yoke. The center core 11 is formed into a pipe shape so as to improve its mechanical strength. Preferably, the material for the pipe 13 is SUS304 or a nonmagnetic material, such as stainless steel or the like.

This is because grounding the pipe 13 makes it possible to shield the electromagnetic waves generated from the coils 12. For the permanent magnets 21, neodymium magnets exhibiting high magnetic performance are used. It is especially important to form the permanent magnets 21 so that they all have the same dimension in the direction of the magnetic pole axis.

If it is important to make the magnet case 22 light-weight, then aluminum alloy or the like is preferably used; however, the material used for the magnet case 22 is not limited thereto. For instance, stone may be used.

Whichever material is used, the magnet case 22 is constructed of three pieces, namely, a case main body 22-1 that accommodates and fixes the plurality of permanent magnets 21 and two covering members 22-2 attached to both ends of the case main body 22-1, which are integrally formed, making it possible to impart sufficient mechanical strength.

The hollow space of the center core 11 is used to pass a cooling fluid, e.g., a liquid, such as oil, or a gas, such as air, therethrough, by making use of the brackets 31, so as to cool from the inside of the coils 12. Furthermore, a cooling liquid or gas is passed through the gap between the outer surface of the coils 12 and the inner surface of the pipe 13 by making use of the brackets 31 so as to cool from the outside of the coils 12.

Referring back to FIG. 2 and FIG. 3A through FIG. 3D, a linear scale 33 for a linear encoder is disposed on a base 30 in the direction in which the mover 20 travels. An encoder head 24 is provided on the magnet case 22 such that it faces against the linear scale 33. A detection signal from the encoder head 24 is supplied to a control drive 40 via a caterpillar-like cable veyor 25 having a flexible signal cable. The detection signal from the encoder head 24 is of course used to control the positioning of the mover 20. Each coil 12 in the stator 10 is connected to a three-phase power cable 35 by making use of the brackets 31, and the power cable 35 is connected to the control drive 40. When the control drive 40 is connected to a single-phase, 100-volt AC power source 50, it incorporates a single-phase to three-phase converter. The U-phase, the V-phase, the W-phase of the single-phase to three-phase converter are connected to a U-phase coil, a V-phase coil, and a W-phase coil. However, as it will become apparent from the explanation hereinafter, the U-phase, the V-phase, and the W-phase of a power source are not necessarily connected to the U-phase coil, the V-phase coil, and the W-phase coil on a one-to-one correspondence. Various modes are available for making connection between a power source and the U-phase coil, the V-phase coil, and the W-phase coil.

Connected also to the control drive 40 is a personal computer 41 serving as a control data input unit and a data processor. Based on the data supplied from the personal computer 41, the control drive 40 carries out the positioning control and speed control of the mover 20 in a full closed loop control mode by using the detection signals from the encoder head 24. A commercially available control drive 40 may be used.

Referring to FIG. 3A through FIG. 3D, detection pieces 26 for positional detection are provided on both ends of the magnet case 22. The two brackets 31 are provided with sensors 36 for detecting the detection pieces 26. The detection signals of the sensor 36 are sent to the control drive 40 and used in the control drive 40 to decide the home position of the mover 20 or to prevent the mover 20 from going out of control. More specifically, the position where the detection pieces 26 are detected by the sensor 36 is established as the home position for the start of the travel of the mover 20. If the mover 20 should go out of control due to some failure during its travel, the travel of the mover 20 is forcibly stopped as soon as the detection pieces 26 reach the positions detected by the sensor 36. The detection pieces 26 may be provided on any movable portion as long as it is a movable portion. The sensor 36 may be provided at any location on a fixed portion as long as it allows the sensor 36 to detect the detection pieces 26. The detection pieces 26 may alternatively be installed on a fixed portion. In this case, the sensor 36 is installed on a movable portion that allows the detection pieces 26 to be detected. Although it is not shown, a table or a stage serving as a driven member is mounted on the upper surface of the magnet case 22.

Figure 5:
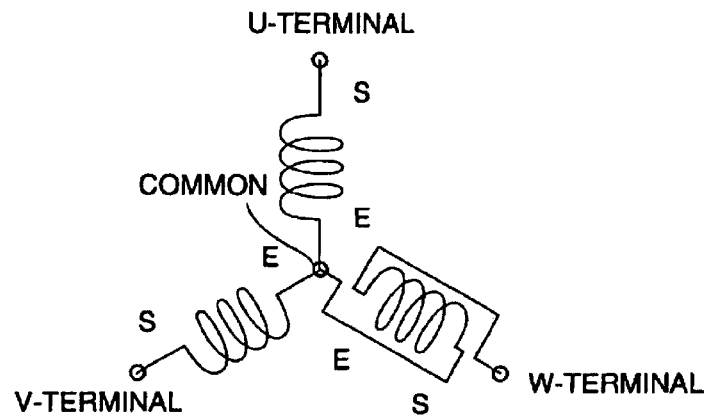
FIG. 5 illustrates the basic construction of an electromagnetic coil used in the present invention.

FIG. 5 shows the basic construction of the U-phase coil, the W-phase coil, and the V-phase coil. In this example, the U-phase coil U1, the W-phase coil W1, and the V-phase coil V1 are in star connection. Each coil has a winding start end S and a winding terminal end E. Two coil winding terminal ends E and one coil winding start end S (the winding start end S of the W-phase coil W1 in this case) are commonly connected to a common terminal.

Figure 6:
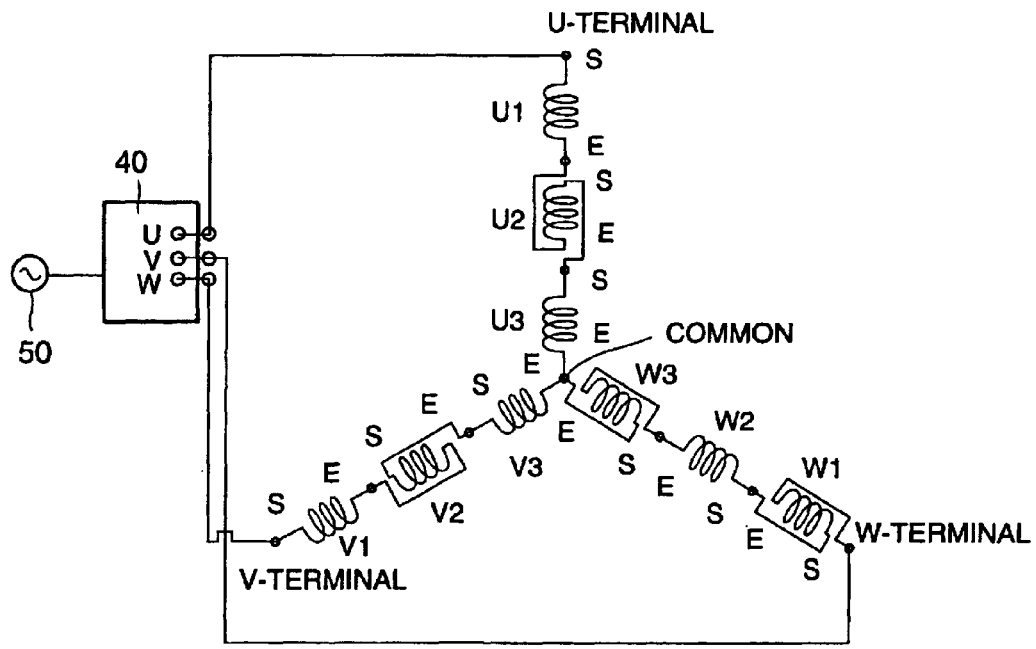
FIG. 6 illustrates an example in which coils and a control drive are connected when nine coils are used for an electromagnetic coil assembly.

FIG. 6 illustrates a connection example in which a total of nine coils, namely, three sets, each set including three coils, a U-phase coil, a W-phase coil, and a V-phase coil, as its basic construction, are involved, and a connection example in which the control drive 40 is used. In this case, regarding the U-phase coil, the winding start end S of a first coil U1 is connected to a U terminal of the control drive 40, and the winding terminal end E of the first coil U1 is connected to the winding terminal end E of a second coil U2. Furthermore, the winding start end S of the second coil U2 is connected to the winding start end S of a third coil U3, and the winding terminal end E of the third coil U3 is connected to the common terminal. Regarding the W-phase coil, the winding terminal end E of a first coil W1 is connected to a V terminal of the control drive 40, and the winding start end S of the first coil W1 is connected to the winding start end S of a second coil W2. Furthermore, the winding terminal end E of the second coil W2 is connected to the winding terminal end E of a third coil W3, and the winding start end S of the third coil W3 is connected to the common terminal. Regarding the V-phase coil, the winding start end S of a first coil V1 is connected to a W terminal of the control drive 40, and the winding terminal end E of the first coil V1 is connected to the winding terminal end E of a second coil V2. Furthermore, the winding start end S of the second coil V2 is connected to the winding start end S of a third coil V3, and the winding terminal end E of the third coil V3 is connected to the common terminal.

In short, when the nine coils are included, as shown in FIG. 6, for two phases, the middle coil among the three coils is connected to its adjacent coils by reversing the winding start end S and the winding terminal end E. For the remaining one phase, two coils on both sides among the three coils are connected to the middle coil by reversing the winding start ends S and the winding terminal end E.

If the linear motor has twelve or more coils, that is, four or more sets of coils, then the connection will be as described below. A plurality of U-phase coils, a plurality of W-phase coils, and a plurality of V-phase coils in a plurality of sets are connected in series for each phase and connected to the control drive 40 by star connection. The plurality of coils in two phases is connected such that the magnetic pole in an even-numbered set is opposite from the magnetic pole in an odd-numbered set. The plurality of coils in the remaining one phase is connected such that the magnetic pole in an odd-numbered set is opposite from the magnetic pole in the odd-numbered set of the plurality of coils in the foregoing two phases, and the magnetic pole in an even-numbered set is opposite from the magnetic pole in the even-numbered set of the plurality of coils in the foregoing two phases.

Figure 7:
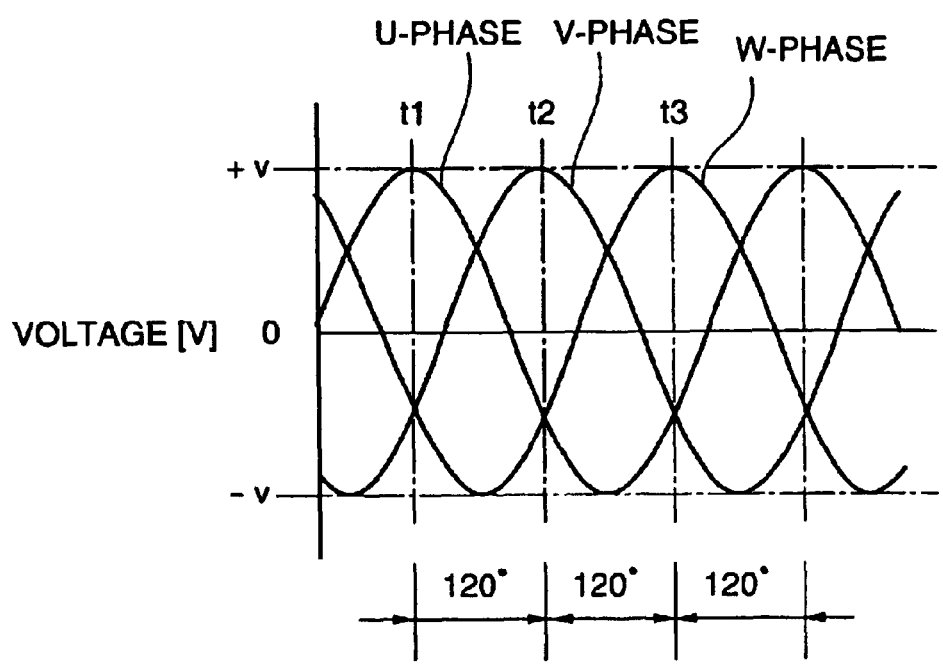
FIG. 7 shows an exemplary voltage waveform based on the control drive shown in FIG. 6.

FIG. 7 shows the voltage waveforms of the control drive 40 connected to the U-phase coil, the V-phase coil, and the W-phase coil described above. It is needless to say that the voltage waveforms of the U-phase, the V-phase, and the W-phase have 120-degree phase differences.

FIG. 8A through FIG. 8C illustrate the changes in the magnetic poles induced at each coil end at timings t1, t2, and t3 shown in FIG. 7 when the control drive 40 that generates the voltage shown in FIG. 7 is connected to the coils shown in FIG. 6.

It is assumed that four coils are disposed in series, as shown in FIG. 9A and FIG. 9B, having the relationships illustrated in FIG. 8A through FIG. 8C. It is also assumed that the magnetic poles shown in FIG. 9A are induced at the coil ends. In this case, as shown in FIG. 9B, no magnetic pole is developed at the portions where opposite magnetic poles attracting each other adjoin, while the magnetic poles that are opposite from those repelling each other are developed in the portions where the same magnetic poles repelling each other adjoin and in an outer end of an outermost coil.

Figure 10A:
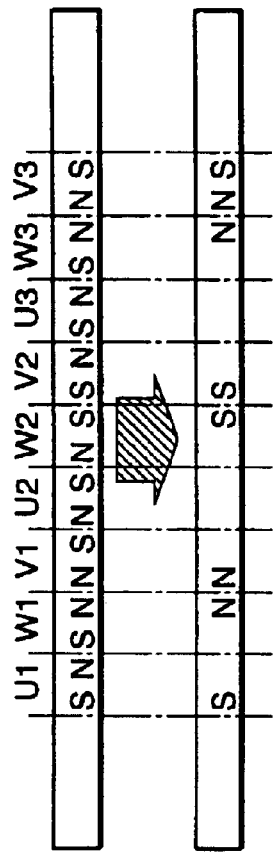
FIG. 10A through FIG. 10C illustrate the magnetic poles generated in all coils by the magnetic poles induced in the individual coils when nine coils are used in the same principle as that illustrated in FIG. 9A and FIG. 9B.
Figure 10B:
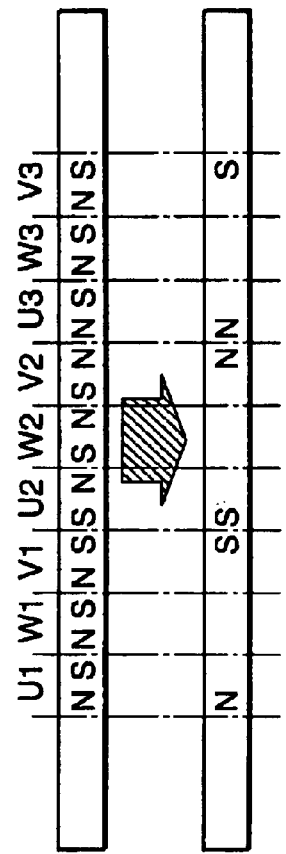
Figure 10C:
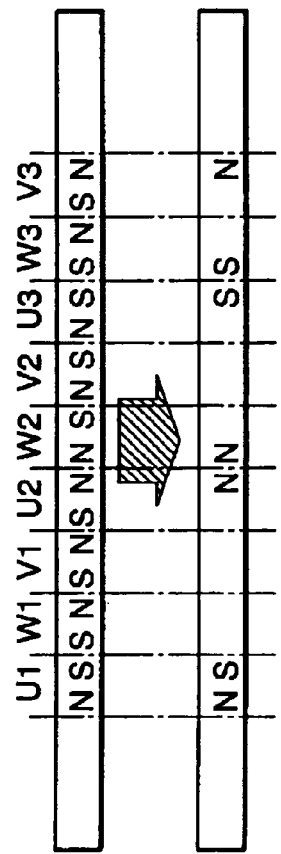

FIG. 10A through FIG. 10C illustrate the magnetic poles actually developed in the assembly combining nine coils by the magnetic poles induced at the coil ends, as shown in FIGS. 8A, 8B, and 8C.

How the linear motor is driven will now be described. The description will be based on an assumption that the mover 20 is formed of four permanent magnets 21.

FIG. 11A, FIG. 11B through FIG. 13A, and FIG. 13B illustrate how the mover 20 moves in one direction (to the left in the drawing in this example) by the interaction between the mover 20 and the magnetic fluxes of the coils when the magnetic poles change, as shown in FIG. 10A through FIG. 10C.

Figure 11A:
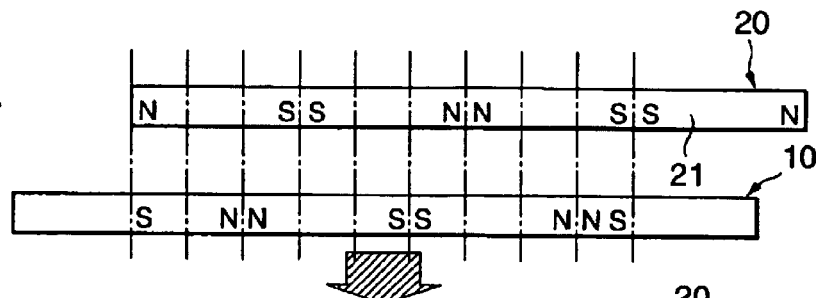
FIG. 11A and FIG. 11B illustrate the principle of how permanent magnets are driven when the permanent magnets are combined with the electromagnetic coils having the magnetic poles shown in FIG. 10A.
Figure 11B:
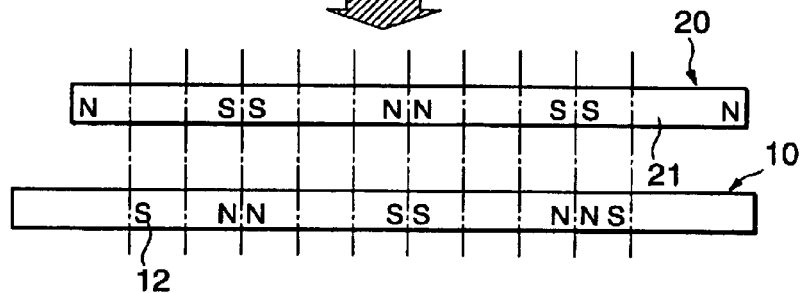

Referring to FIG. 11A and FIG. 11B, when the mover 20 is at the position shown in FIG. 11A, if the magnetic poles shown in FIG. 11A (corresponding to FIG. 10A) are generated by the nine coils 12 in the stator 10, then the mover 20 moves to the left in the figure by the distance equivalent to the length of one coil, as shown in FIG. 11B.

Figure 12A:
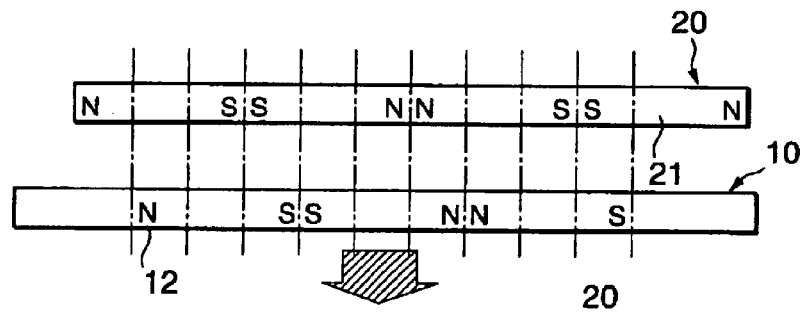
FIG. 12A and FIG. 12B illustrate the principle of how permanent magnets are driven when the permanent magnets are combined with the electromagnetic coils having the magnetic poles shown in FIG. 10B.
Figure 12B:
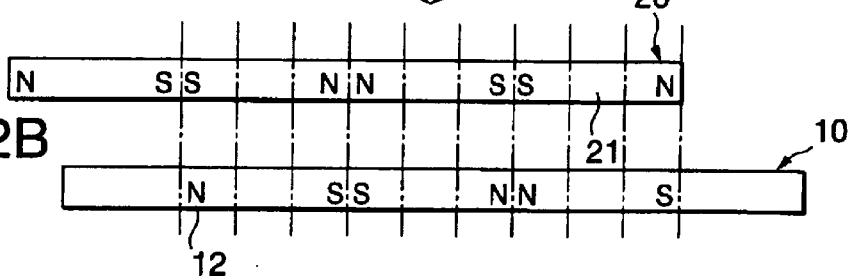

Then, when the mover 20 is at the position shown in FIG. 11B, if the magnetic poles shown in FIG. 12A (corresponding to FIG. 10B) are generated by the nine coils 12, then the mover 20 moves to the left in the figure by the distance equivalent to the length of two coils, as shown in FIG. 12B.

Furthermore, when the mover 20 is at the position shown in FIG. 12B, if the magnetic poles shown in FIG. 13A (corresponding to FIG. 10C) are generated by the nine coils 12, then the mover 20 moves to the left in the figure by the distance equivalent to the length of two coils, as shown in FIG. 13B.

Subsequently, when the mover 20 is at the position shown in FIG. 13B, if the magnetic poles shown in FIG. 14A (corresponding to FIG. 10A) are generated by the nine coils 12, then the mover 20 moves to the left in the figure by the distance equivalent to the length of two coils, as shown in FIG. 14B.

According to the description given above, the mover 20 may seem to move in steps by the distance that depends upon the dimension of one coil. This, however, does not happen in an actual operation. This is because the description has been given of how the linear motor according to the embodiment works only in relation to the timings t1 through t3 shown in FIG. 7. In the actual operation, however, the voltage applied to the U-phase coil, the V-phase coil, and the W-phase coil has the continuous waveform, as shown in FIG. 7. Therefore, the travel of the mover 20 is smooth. In addition, the positioning can be performed with the accuracy decided by the resolution of the linear scale 33 and the detection accuracy of the encoder head 24.

The travel distance of the mover 20 in FIG. 12A, FIG. 12B through FIG. 14A, and FIG. 14B is equivalent to the length of two coils, while it is equivalent to the length of one coil in FIGS. 11A and 11B. This is because the position where the mover 20 was set at the beginning is shifted. In the actual operation, the mover 20 repeats the cycle illustrated in FIG. 12A, FIG. 12B through FIG. 14A, and FIG. 14B.

In FIG. 11A, FIG. 11B through FIG. 14A, and FIG. 14B, the distance between the magnetic poles is always equivalent to the length of three coils at the central portion of the assembly consisting of the nine coils 12, while the distance between the magnetic poles near the ends of the assembly is equivalent to the length of one or two coils. This may seem to influence the travel of the mover 20. Such a problem, however, will not occur in the actual operation. The illustration is intended merely for easier understanding, and includes the nine coils 12. For practical use, the mover 20 is designed so that the ends of the traveling mover 20 do not go beyond the ends of the assembly consisting of the plurality of coils 12. In other words, in practical applications, any portion of the mover 20 does not travel beyond the ends of the assembly of the nine coils 12, as shown in FIG. 11A, FIG. 11B through FIG. 14A, and FIG. 14B.

In any case, the linear motor according to the embodiment allows the mover 20 to travel in various modes by setting necessary data on the personal computer 41 explained in conjunction with FIG. 2. More specifically, the mover 20 of the linear motor according to the embodiment can be moved to a desired position in the stator 10, and can also be reciprocated (oscillated) in a certain distance range area in the stator 10. Moreover, it is possible to control the traveling speed so as to, for example, move the mover 20 forward at a normal speed from a home position to a desired set position, and backward to the home position at a higher speed. This means that the time for repetitive transporting operation can be shortened. The speed control can be easily accomplished by supplying current that passes in the opposite direction from that for the forward travel and by changing the frequency of the power source to move the mover 20 backward.

The connection between the mover 20 and the stator requires only a minimum of a flexible signal line, i.e., the signal line for the encoder head 24. This means that the cable veyor 25 (refer to FIG. 3A) does not need a space for accommodating a power cable, permitting a reduced size to be achieved. Furthermore, it has been verified that speed variations can be controlled to 1(%) or less at the speed of 100 mm/sec.

The encoder head 24 may be provided on the base 30. In this case, the traveling range of the mover 20 is restricted, so that the construction may be applied to a type of linear motor that requires a relatively small reciprocating stroke. This type of linear motor is extremely advantageous in that it obviates the need for a flexible power cable and a signal line.

The first embodiment in accordance with the present invention has been described. The present invention can be implemented in diverse modifications as described below.

FIGS. 15A and 15B show another example of permanent magnets. More specifically, in the first embodiment discussed above, the permanent magnets 21 are magnetized in the direction of its central axis, i.e., in parallel to the central axis. Permanent magnets 21' in this example are magnetized in the radial direction, i.e., magnetized radially with respect to the central axis. This example also includes a plurality of the permanent magnets 21', which are combined in series, the length per magnet being formed to be three times as long as the dimension of the coil 12 (FIG. 4B) in the direction of the magnetic pole axis. The adjacent permanent magnets 21' are combined in close contact such that opposite magnetic poles oppose each other.

The permanent magnets magnetized in parallel to the central axis and the permanent magnets magnetized in the radial direction are not limited to the cylindrical permanent magnet which is integrally formed. Alternatively, divided permanent magnets may be combined. For instance, a magnet material may be divided into a plurality of pieces at certain angular intervals (e.g., into four pieces at 90 degrees, or eight pieces at 45 degrees) in the circumferential direction may be prepared, and the pieces may be magnetized in parallel to the central axis or in the radial direction, then combined into a cylindrical shape, thereby creating the permanent magnet assembly.

FIGS. 16A and 16B show an example wherein an assembly of the foregoing permanent magnets 21' is covered by a cylindrical member made of magnetic material, namely, a cylindrical outer yoke 61. In these figures, the coils are not shown. The outer yoke 61 provides magnetic shielding effect around the outer periphery of the outer yoke 61. In other words, the leakage of magnetic fluxes from the linear motor can be reduced, and an efficient magnetic circuit can be constructed, permitting improved thrust of a linear motor to be achieved.

FIGS. 17A and 17B show an example in which the outer yoke 61 shown in FIGS. 16A and 16B has been applied to the permanent magnets 21 in the first embodiment described above. It is needless to say that this example also provides the same advantages as those of the example shown in FIGS. 16A and 16B.

Figure 18:
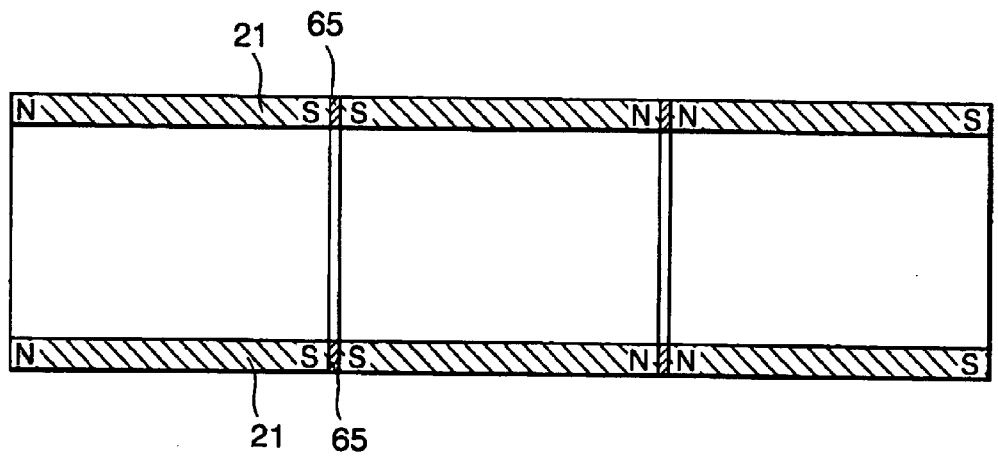
FIG. 18 is a sectional view for illustrating an improved example of a permanent magnet assembly of the mover in the present invention.

FIG. 18 illustrates an improved example that exhibits improved performance of the permanent magnets 21. More specifically, a magnetic component, e.g., an annular spacer 65 made of an iron disc, is provided between adjoining permanent magnets 21 of the same magnetic pole. The spacer 65 has a thickness suited to the magnet dimensions (the inside and outside diameters and the axial length of the magnet). Providing the spacer 65 between the repelling magnetic field portions where the two permanent magnets 21 repel each other constitutes a magnetic circuit in which magnetic fluxes extend in the radial direction of the coils. This contributes to the improved performance of the permanent magnets 21. The spacer 65 may of course be combined with any of the examples shown in FIG. 15 through FIG. 17.

Figure 19:
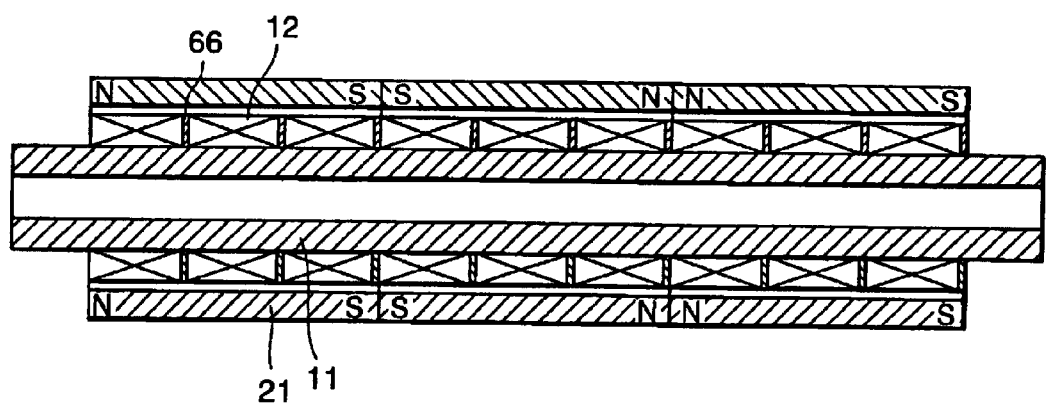
FIG. 19 is a sectional view for illustrating an improved example of the coil of a stator in the present invention.

FIG. 19 shows an improved example of the coils 12. More specifically, an annular spacer 66 formed of a magnetic material, for example, an iron disc, is provided between adjoining coils 12. A thickness of 1 mm or less is sufficient for the spacer 66 to contribute to improved thrust performance. The spacer 66 may of course be combined with any of the examples shown in FIG. 15 through FIG. 18.

FIGS. 20A through 20D show another example of the three-phase coil. In the first embodiment, the coils in series star connection were discussed as the three-phase coils. It is needless to say, however, that the coils may be in delta connection, as shown in FIG. 20A. FIG. 20B shows three-phase coils in parallel delta connection, which may be considered to be categorized as coils in delta connection. For the same reason, the coils in parallel star connection shown in FIG. 20C may be considered to be categorized as coils in star connection. These coils are arranged as shown in FIG. 20D, as it has been explained in conjunction with FIG. 8A through FIG. 8C.

In another modification example, an insulating liquid, for instance, may be used as a liquid coolant to cool the outer peripheral side of the coils 12 by circulating the liquid coolant. In this case, the surfaces of the coils 12 are preferably coated with a resin material or the like.

Alternatively, the pipe 13 may be omitted if the operating environment of a linear motor does not require cooling or exerts no influences of chemicals on the coils, or the appearance of the coil surfaces is not important. In this case, the absence of the pipe 13 makes it possible to shorten the distance between the magnets and the surfaces of the coils, leading to improved thrust.

As an example of a power wiring for exciting the coils 12, a groove may be provided in the outer peripheral surface of the center core 11 in the lengthwise direction and the wiring may be embedded in the groove, so that the surfaces of the coils and the surfaces of the magnets can be brought even closer to each other, resulting in improved thrust.

Figure 21:
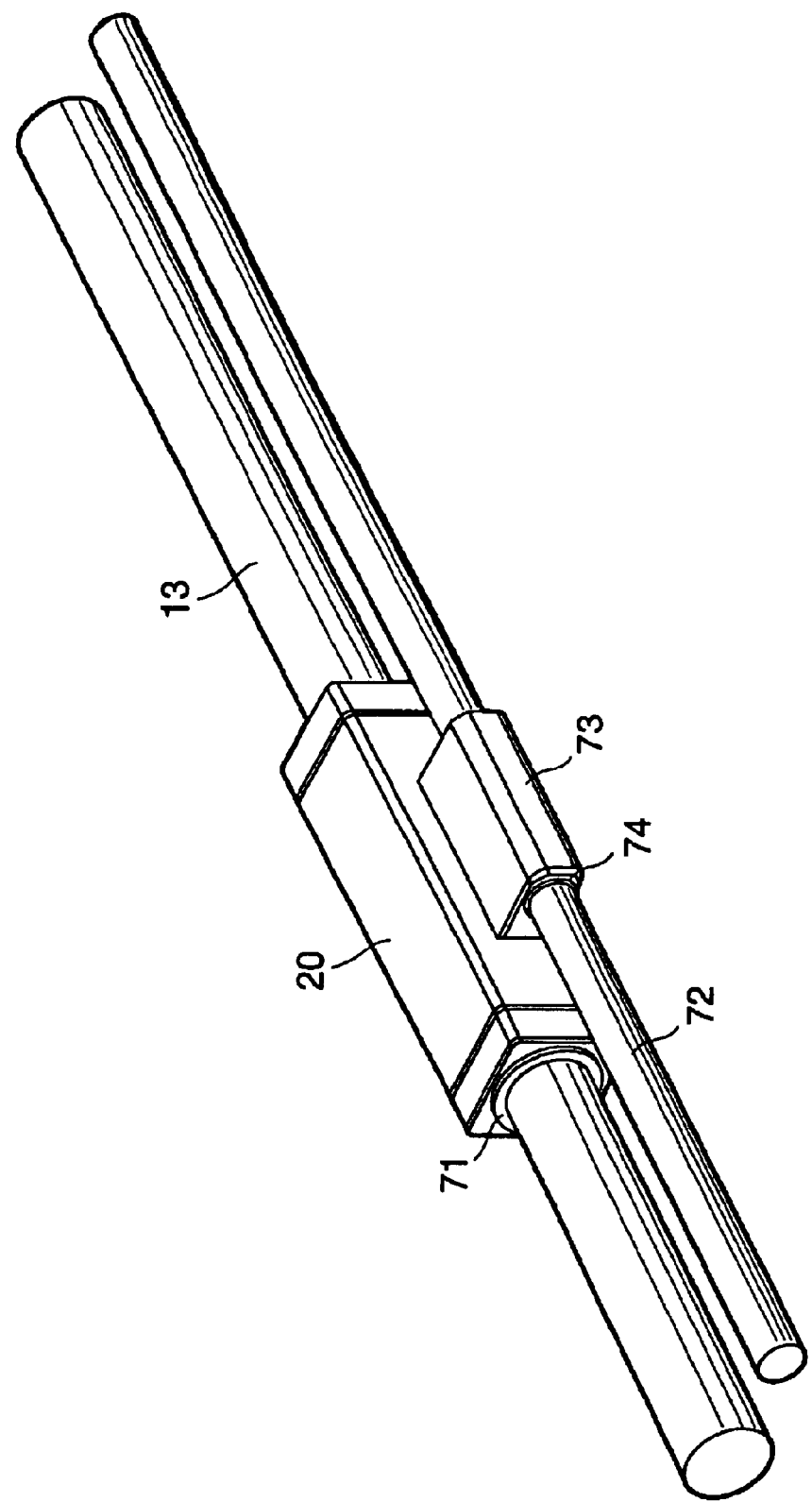
FIG. 21 is a perspective view illustrating another example of a guiding system of the mover in the present invention.

FIG. 21 shows another example of the guiding system of the mover 20. In the first embodiment shown in FIGS. 4A and 4B, the mover 20 is guided by the guide blocks 23 and the guide rail 32. In this example, a resinous bushing 71 is provided on the inside diameter side of the permanent magnets 21 so as to allow the mover 20 to slide along the pipe 13 on the stator 10. In addition, a guiding pipe 72 is provided in parallel to the pipe 13. An auxiliary member 73 that extends to the guiding pipe 72 is provided on a side surface of the mover 20. The auxiliary member 73 is provided with a through hole in which the guiding pipe 72 can be inserted, and a resinous bushing 74 is provided in the inside diameter side of the through hole. This enables the auxiliary member 73 to slide along the guiding pipe 72. The bushings 71 and 74 can be implemented by, for example, sliding bearings. Such a guiding system is advantageously used as a drive source for moving, for example, the printing head of a printer when the mover 20 is small.

In the above first embodiment, the descriptions have been given of the case where one set of the mover and the stator. The present invention, however, is not limited thereto. Alternatively, two or more sets of the movers and the stators may be installed in parallel, a table common to the plural movers may be mounted to carry out control of drive with improved thrust. In this case, a guide rail in each set may be mounted on a base in parallel.

Figure 22:
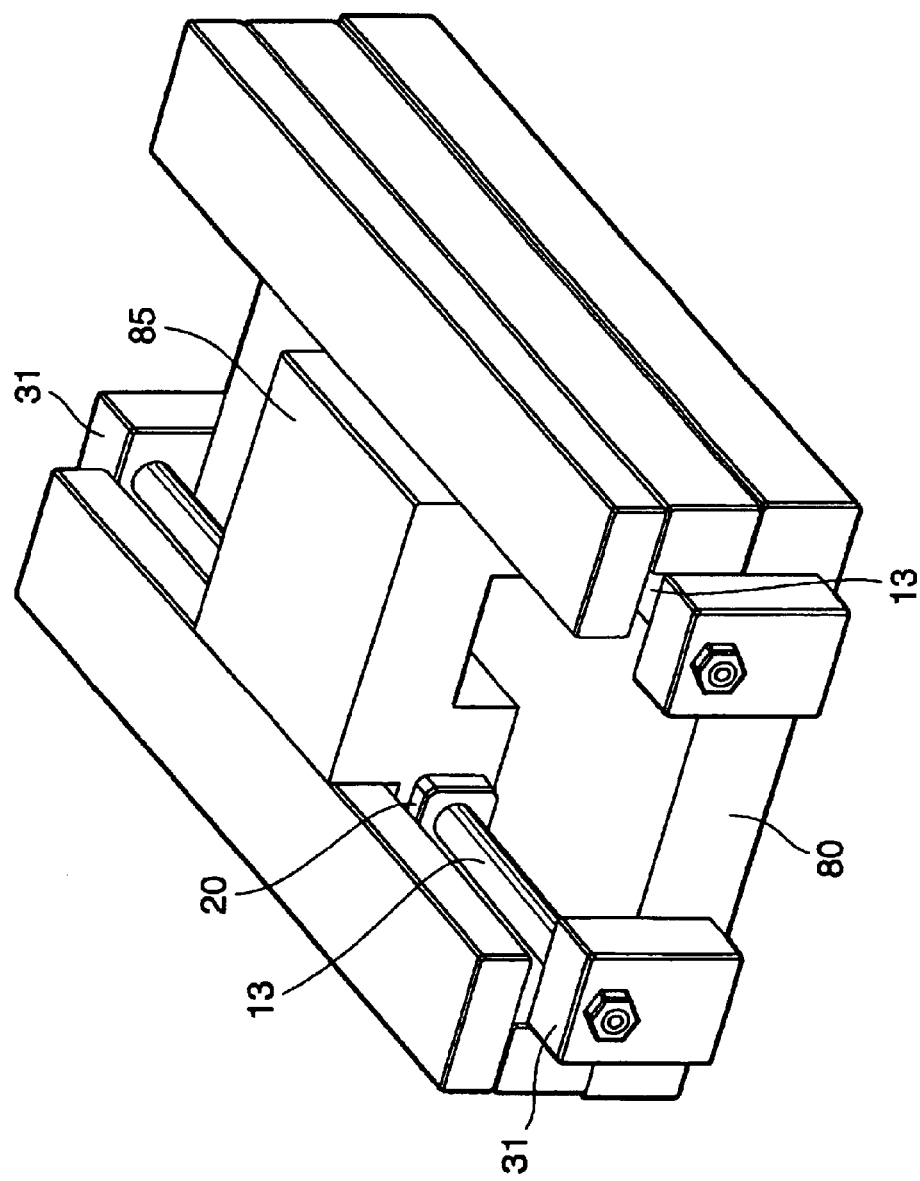
FIG. 22 illustrates a biaxial drive table apparatus in accordance with a second embodiment of the present invention.

FIG. 22 shows a second embodiment in accordance with the present invention with the aspects described above taken into account. In this example, a table-shaped slider (movable member) is driven by a twin-shaft guide by using at least one linear motor explained in the first embodiment. The descriptions will be given of the case where two linear motors are used. Two pipes 13 on a stator 10 mentioned above are provided on a base 80 formed of a stone or ceramic material or the like such that they are parallel to each other. A slider (movable member) 85 having two movers 20 (only one of them being shown) is mounted on the outer peripheries of the pipes 13. More specifically, in this example, the slider (movable member) 85 and the permanent magnets are integrally formed. In other words, the permanent magnets are embedded in the slider 85. Thus, the slider 85 has two functions, namely, the function as a guide and the function as a motor.

The two movers 20 are controlled such that they move in synchronization. The number of the linear motors may be one.

A possible application of this embodiment is a table device for processing wafers in a semiconductor manufacturing apparatus or a coater or the like for coating workpieces by repeating reciprocating motion.

In the above example, the stator 10 has a linear shape. Alternatively, however, the stator may be formed to be circular or arcuate with a certain radius. More specifically, the linear motor in accordance with the present invention is not limited to have linear motion, but may alternatively have circular or reciprocating motion on a circular or arcuate trajectory by forming its stator into a circular or arcuate shape. In this case, the space on the inside diameter side of the assembly of the plural permanent magnets 21 in the mover 20 may also be formed to have the same curvature as that of the stator. When the stator is formed to be circular, the section of the mover must have a substantially U shape. A possible application for a motor with such a circular or arcuate stator includes the drive source for a scanner in a nuclear magnetic resonance or magnetic resonance imaging (MRI) diagnosing apparatus, a CT scanner, etc.

The direct acting linear motor in accordance with the present invention can be also applied to a drive source for opening and closing of, example, an automatic door or the like. In the case of an automatic door, for instance, a linear motor in accordance with the present invention may be installed on the upper or lower side of the door such that the door may be opened or closed as the movable unit of the linear motor travels.

Furthermore, the guiding mechanism of the mover 20 may include a static pressure air bearing. The combination of the linear scale and the encoder head for positioning control may be replaced by another well-known art, such as a high-accuracy art using a laser. The combination of the detection pieces 26 and the sensor 36 may be omitted.

The linear motors in accordance with the present invention provide the following advantages:

(1) The electromagnetic coil assembly is fixed, and the permanent magnet assembly is movable, so that the electromagnetic coil assembly that generates heat can be cooled with a simple structure.

(2) The movable unit remains cool, so that the temperature of the table combined with and carried by the movable member does not rise. Hence, the workpieces mounted on the table are not subjected to thermal influences. The linear motors in accordance with the present invention are, therefore, ideally used as conveying drive systems in an operating environment with severe temperature conditions, such as in a vacuum chamber of a semiconductor manufacturing apparatus.

(3) The electromagnetic coil assembly is accommodated and disposed with a very small gap provided between themselves and the inner surface of an annular or U-shaped permanent magnet assembly, allowing the magnetic fluxes of the electromagnetic coil assembly to effectively act on the permanent magnets. An annular permanent magnet, in particular, exhibit highly efficient use of the magnetic fluxes of the electromagnetic coil assembly, permitting higher thrust to be obtained.

(4) There is no need to supply electric power to the movable unit, thus obviating the need for a flexible power cable, and therefore obviating the need for the maintenance for disconnection or the like of the power cable.

(5) To make the electromagnetic coil assembly movable, it is necessary to monitor the temperature rise thereof, meaning that it is accordingly necessary to provide the electromagnetic coil assembly with a thermocouple or the like, and to send out temperature detection signals to a control drive by a flexible signal line. The present invention obviates such need.

(6) A flexible power cable or signal line is repeatedly subjected to bending with possible resultant disconnection. According to the present invention, the disconnection of the power cable does not occur, and the possibility of the disconnection of the signal line can be also eliminated by installing an encoder head on a base member.

(7) The case for the permanent magnets in the movable unit can be implemented a one-piece aluminum alloy constituent, ensuring high mechanical strength.

(8) All components except for the permanent magnets formed of an expensive material are available at low cost, meaning that the total cost for a linear motor can be controlled even when the linear motor is considerably large.

(9) The gap between a mover and a stator is not required to be constant, obviating the need for strict accuracy for mounting the mover and the stator and the need for strict accuracy for machining the parts constituting them.

(10) Since the center core (yoke) has a linear cylindrical shape, an extremely high level of constant speed performance can be achieved due to the absence of fragmentary forces of attraction between the permanent magnets and the center core (yoke).

What is claimed is:

1. A linear motor comprising:
   a plurality of electromagnetic coils continuously arranged; and
   a permanent magnet assembly disposed such that it may be moved along the electromagnetic coils by the interaction between itself and the magnetic fluxes from the electromagnetic coils;
   wherein the electromagnetic coils comprise U-phase coils, V-phase coils and W-phase coils in one of a star connection and a delta connection, and
   wherein these coils of individual phases are fixedly installed in series around a hollow-shaft center core over the full distance of the travel of the permanent magnet assembly such that the magnetic pole axis thereof is oriented in the same direction as that of the axis of the center core.

2. The linear motor according to claim 1,
   wherein the permanent magnet assembly includes one of an annular and a substantially U-shaped section so as to surround the electromagnetic coils and comprises a plurality of permanent magnets, and
   each permanent magnet includes a dimension that is three times the length of the coil of each phase in relation to the magnetic pole axis.

3. The linear motor according to claim 2,
wherein the plural permanent magnets are individually magnetized in an arrangement selected from in parallel to a central axis and radially with respect to the central axis,
and combined in series such that the series has one of the same magnetic poles or and opposite magnetic poles face each other.

4. The linear motor according to claim 3, wherein a cylindrical yoke comprising a magnetic constituent is provided on the outer side of the permanent magnet assembly.

5. The linear motor according to claim 4, wherein a spacer comprising magnetic material is provided between the magnetic poles of adjoining permanent magnets.

6. The linear motor according to claim 5, wherein a spacer comprising magnetic material is provided between the adjoining coils of the individual phases.

7. The linear motor according to claim 6, wherein the center core includes a linear shape so that the permanent magnet assembly exhibits a linear motion.

8. The linear motor according to claim 6,
wherein the center core is formed to have a circular shape or an arcuate shape, which is a partly cut-off circular shape, in its extending direction, and
the permanent magnet assembly circularly moves along a circular or arcuate trajectory.

9. The linear motor according to claim 6,
wherein a cylindrical member that extends over the travel range of the permanent magnet assembly to accommodate the electromagnetic coils is provided on the inner surface side of the permanent magnet assembly and on the outer surface side of the electromagnetic coils, and
a gap is provided between the cylindrical member and the inner surface of the permanent magnet assembly, and another gap is provided between the cylindrical member and the outer surfaces of the electromagnetic coils.

10. The linear motor according to claim 10, wherein the interior of the center core and the gap between the outer surfaces of the electromagnetic coils and the inner surface of the cylindrical member provide cooling spaces.

11. The linear motor according to claim 10, wherein a guide block is attached to the permanent magnet assembly, and the guide block is led by a guide member disposed on a base member in the direction in which the permanent magnet assembly travels.

12. The linear motor according to claim 11,
wherein the permanent magnet assembly is housed in a case,
at least one first slide bearing that is slidable along the outer surface of the cylindrical member is provided on the inner surface of the case,
an auxiliary member is provided on a side surface of the case, the auxiliary member extending sideways,
the auxiliary member is provided with a through hole in parallel to the direction in which it travels, and a second slide bearing is provided on the inner surface thereof,
a guiding member is provided in parallel to the cylindrical member such that it extends in its traveling direction, and
the guiding member is inserted in the second slide bearing so as to guide the travel of the permanent magnet assembly.

13. The linear motor according to claim 12, wherein the cylindrical member accommodating the electromagnetic coils is fixed between two brackets provided on the base member.

14. The linear motor according to claim 13,
wherein a linear scale is disposed in the direction in which the permanent magnet assembly travels,
the permanent magnet assembly is provided with an encoder head that opposes the linear scale, and
a detection signal from the encoder head is supplied to a control drive via a flexible cable.

15. The linear motor according to claim 14,
wherein one of a movable unit including the permanent magnet assembly and a fixed unit including the brackets is provided with a detection piece for detecting positions, and the other thereof is provided with a sensor for detecting the detection piece.

16. The linear motor according to claim 1,
wherein the electromagnetic coils include a plurality of sets of a combination in which a U-phase coil, a V-phase coil, and a W-phase coil are arranged in sequence and in series as a set, and
the plural sets of coils are installed in series around the hollow-shaft center core over the travel range of the permanent magnet assembly such that the magnetic pole axis thereof is oriented in the same direction as that of the axis of the center core.

17. The linear motor according to claim 16,
wherein a plurality of U-phase coils, a plurality of V-phase coils, and a plurality of W-phase coils in the plurality of sets are connected in series for each phase and joined in star connection,
the plural coils in two phases are connected such that the magnetic pole in an even-numbered set is opposite from the magnetic pole in an odd-numbered set,
the plural coils in the remaining one phase are connected such that the magnetic pole in an odd-numbered set is opposite from the magnetic pole in the odd-numbered set of the plural coils in the two phases, and
the magnetic pole in an even-numbered set is opposite from the magnetic pole in the even-numbered set of the plural coils in the two phases.

18. A linear motor comprising:
a plurality of electromagnetic coils so as to be movable; and
a permanent magnet assembly disposed along the electromagnetic coils by the interaction between itself and the magnetic fluxes from the electromagnetic coils;
wherein the electromagnetic coils comprise a plurality of individual phases, and
wherein the electromagnetic coils of individual phases are fixedly installed in series around a hollow-shaft center core. over the full distance of the travel of the permanent magnet assembly. the magnetic pole axis thereof is oriented in the same direction as that of the axis of the center core.

19. The linear motor according to claim 18, wherein the electromagnetic coils extend over the full distance of the travel of the permanent magnet assembly.

20. The linear motor according to claim 18, wherein the magnetic pole axis of the magnetic coils is oriented in the same direction as that of the axis of the center core.

21. The linear motor according to claim 18, wherein the electromagnetic coils are continuously arranged.

* * * * *